United States Patent

Da

(10) Patent No.: US 10,582,545 B2
(45) Date of Patent: Mar. 3, 2020

(54) SYSTEM AND METHOD FOR CONTROLLING NETWORK TRAFFIC BY RESTRICTING A SET OF CYCLIC SHIFTS FOR LONG-TERM EVOLUTION (LTE) PHYSICAL RANDOM ACCESS CHANNEL (PRACH) PREAMBLES

(71) Applicant: Alcatel-Lucent, Boulogne-Billancourt (FR)

(72) Inventor: Ren Da, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 228 days.

(21) Appl. No.: 14/865,952

(22) Filed: Sep. 25, 2015

(65) Prior Publication Data

US 2017/0055297 A1 Feb. 23, 2017

Related U.S. Application Data

(60) Provisional application No. 62/205,802, filed on Aug. 17, 2015.

(51) Int. Cl.
  *H04W 74/08* (2009.01)
  *H04J 13/00* (2011.01)
  (Continued)

(52) U.S. Cl.
  CPC ..... *H04W 74/0866* (2013.01); *H04J 13/0062* (2013.01); *H04L 27/2613* (2013.01); *H04W 72/0413* (2013.01)

(58) Field of Classification Search
  CPC .......................... H04W 74/0866; H04W 74/00; H04J 13/0062
  See application file for complete search history.

(56) References Cited

U.S. PATENT DOCUMENTS

| 2011/0255394 A1* | 10/2011 | Zha ..................... H04J 11/0069 370/203 |
| 2014/0010214 A1 | 1/2014 | Hooli et al. |

(Continued)

OTHER PUBLICATIONS

ETSI TS 136 211, "LTE; Evolved Universal Terrestrial Radio Access (E-UTRA); Physical channels and modulation" (3GPP TS 36.211 version 12.5.0 Release 12), Apr. 2015, ETSI, v12.5.0, sections 5.7.2 and 5.7.3.*

(Continued)

*Primary Examiner* — Kodzovi Acolatse
(74) *Attorney, Agent, or Firm* — Harness, Dickey & Pierce, P.L.C.

(57) ABSTRACT

The controlling of the network traffic is implemented in a communication network by obtaining first configuration parameters for physical random access channel (PRACH) preambles, the first configuration parameters including a first preamble format, a zero correlation zone configuration index, and a list of physical root Zadoff-Chu sequence indexes. A set of cyclic shifts corresponding to a first frequency offset is generated based on the first preamble format, the zero correlation zone configuration index, and the list of physical root Zadoff-Chu sequence indexes. Second configuration parameters are exported in order to control network traffic, the second configuration parameters including the set of cyclic shifts.

13 Claims, 10 Drawing Sheets

(51) Int. Cl.
*H04L 27/26* (2006.01)
*H04W 72/04* (2009.01)

(56) References Cited

U.S. PATENT DOCUMENTS

2016/0119887 A1* 4/2016 Charipadi ........... H04W 56/001
                                                        370/335
2017/0086228 A1* 3/2017 Wu ....................... H04W 74/08

OTHER PUBLICATIONS

3GPP TS 23:203, "Policy and Charging Control Architecture," V10.6,0 (Mar. 2012).
3GPP TS 36.211, "E-UTRA: Physical Channels and Modulation," V12.5.0 (Mar. 2015).
S. Sesia, et al., *LTE—The UMTS Long Tenn Evolution*, John Wiley & Sons, 2011.
R4-154363 "Impact of High Dopper on PRACH Detection," Alcatel-Lucent.
3GPP TS 36.211, "E-UTRA: Physical Channels and Modulation," V12 (Dec. 2014).
Bertrand et al., "Chapter 19, Random Access", *LTE—The UMTS Long Term Evolution*, John Wiley & Sons, pp. 421-445, Feb. 17, 2009.
International Search Report and Written Opinion dated Nov. 10, 2016 in related PCT/IB2016/001239.

\* cited by examiner

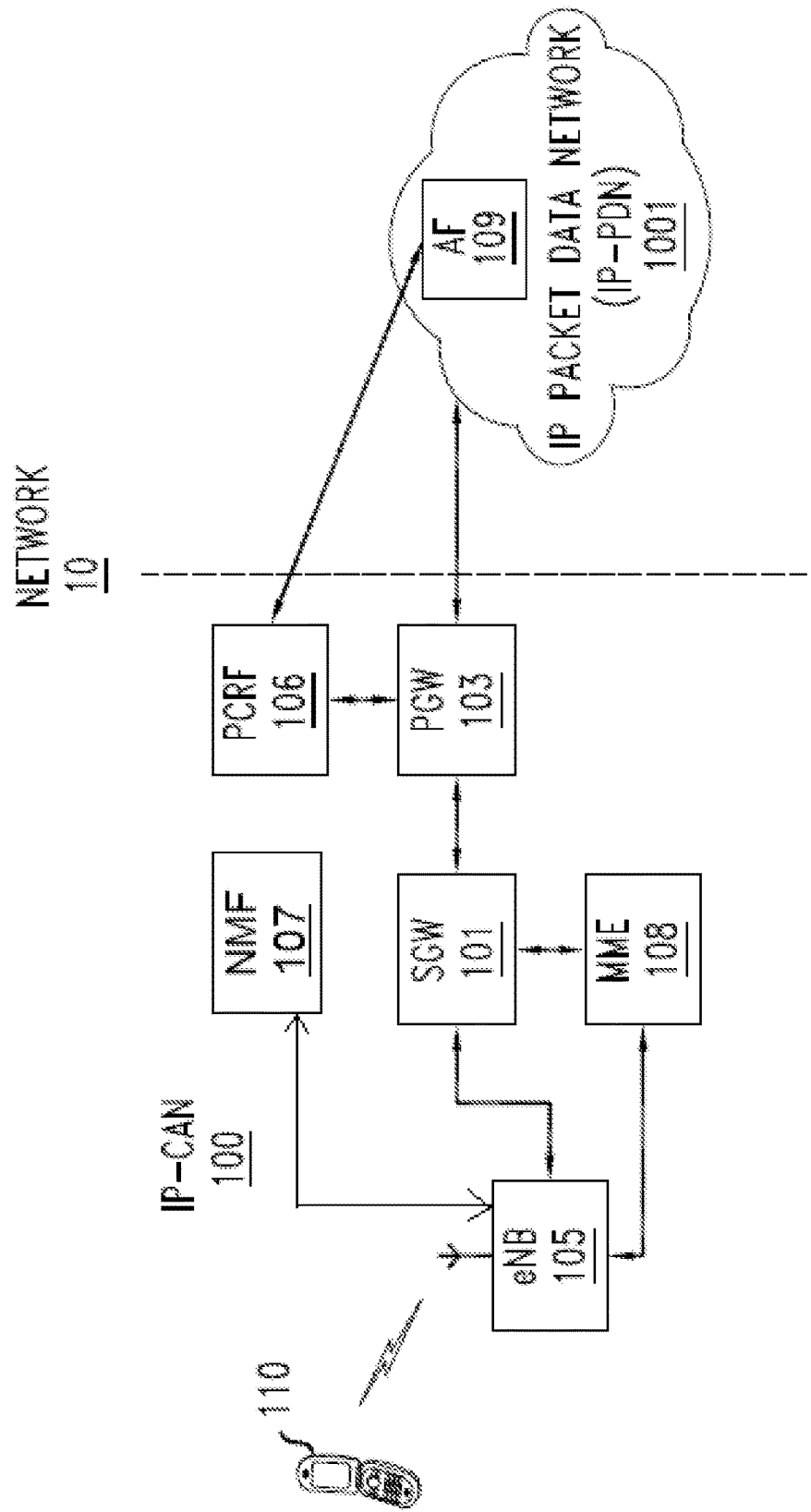
FIG. 1
(CONVENTIONAL)

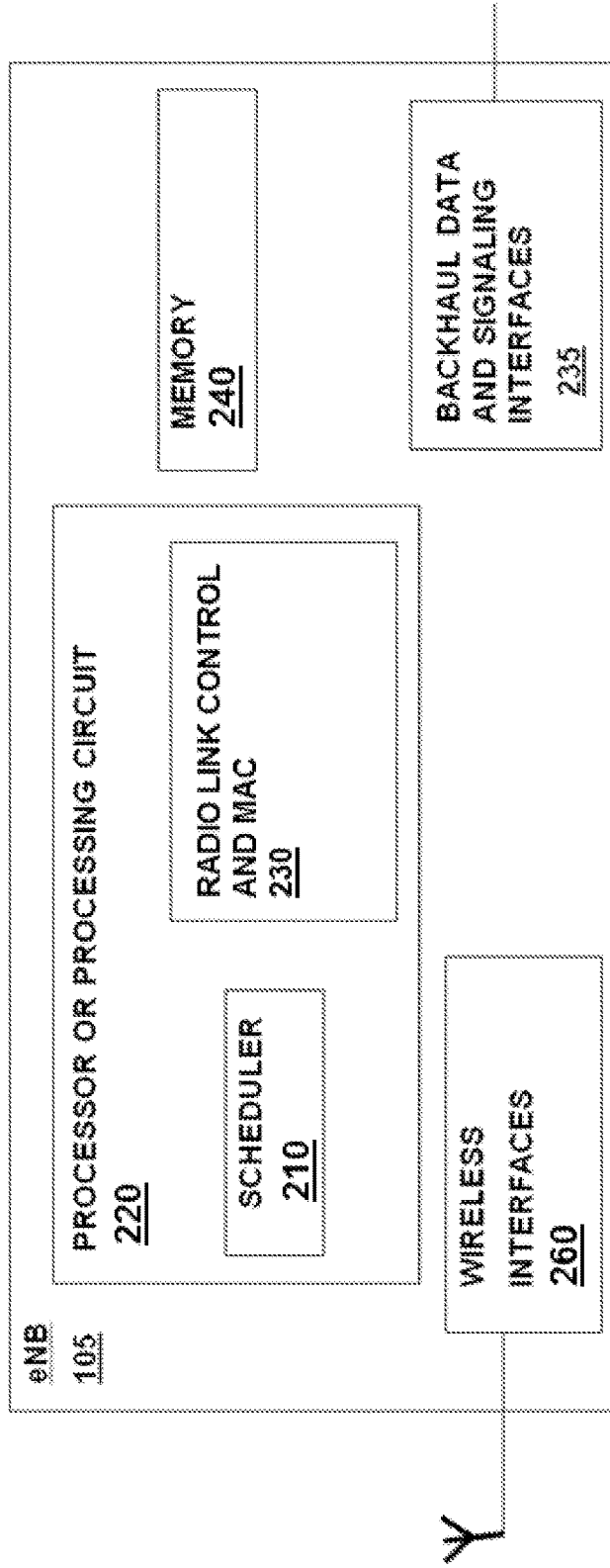
FIG. 2
(CONVENTIONAL)

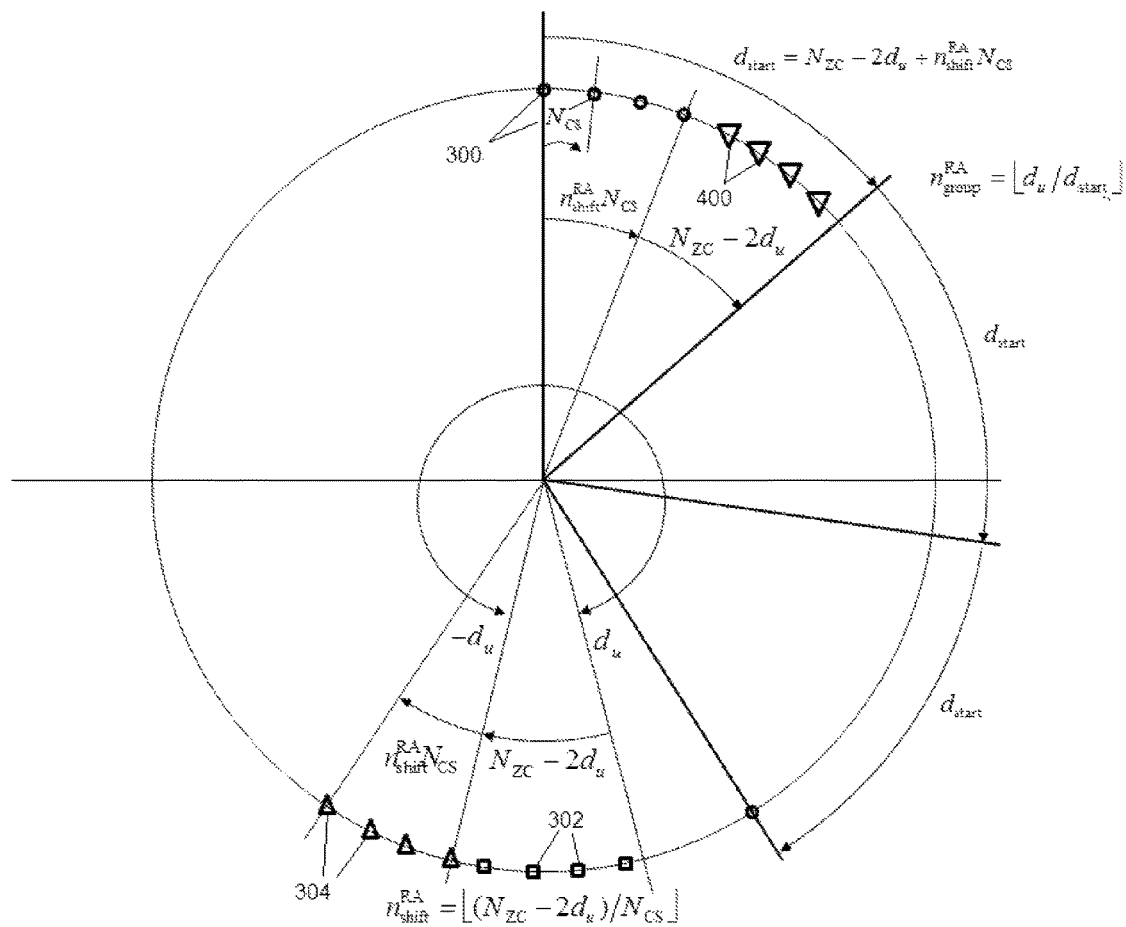
FIG. 4
(CONVENTIONAL)

SYSTEM AND METHOD FOR CONTROLLING NETWORK TRAFFIC BY RESTRICTING A SET OF CYCLIC SHIFTS FOR LONG-TERM EVOLUTION (LTE) PHYSICAL RANDOM ACCESS CHANNEL (PRACH) PREAMBLES

PRIORITY STATEMENT

This application is a non-provisional application that claims priority to U.S. Provisional Application No. 62/205,802, filed on Aug. 17, 2015, the entire contents of which is incorporated by reference in its entirety.

BACKGROUND OF THE INVENTION

Field of the Invention

Example embodiments relate generally to a system and method for generating restricted sets of cyclic shifts for long-term evolution (LTE) physical random access channel (PRACH) preambles in order to control telecommunication traffic on cells that serve user equipments (UEs) traveling at a high rate of speed.

Related Art

FIG. 1 illustrates a conventional 3$^{rd}$ Generation Partnership Project Long-Term Evolution (3GPP LTE) network 10. The network 10 includes an Internet Protocol (IP) Connectivity Access Network (IP-CAN) 100 and an IP Packet Data Network (IP-PDN) 1001. The IP-CAN 100 generally includes: a serving gateway (SGW) 101; a packet data network (PDN) gateway (PGW) 103; a policy and charging rules function (PCRF) 106; a network management function (NMF) 107; a mobility management entity (MME) 108 and E-UTRAN Node B (eNB) 105 (i.e., base station, for the purposes herein the terms base station and eNB are used interchangeably). Although not shown, the IP-PDN 1001 portion of the EPS may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, the NMF 107 and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for one or more user equipments (UEs) 110. That is to say, any number of UEs 110 may be connected (or attached) to the eNB 105. The eNB 105 is operatively coupled to the SGW 101, the NMF 107, and the MME 108.

The SGW 101 routes and forwards user data packets, while also acting as the mobility anchor for the user plane during inter-eNB handovers of UEs. The SGW 101 also acts as the anchor for mobility between 3$^{rd}$ Generation Partnership Project Long-Term Evolution (3GPP LTE) and other 3GPP technologies. For idle UEs 110, the SGW 101 terminates the downlink data path and triggers paging when downlink data arrives for UEs 110.

The PGW 103 provides connectivity between UE 110 and the external packet data networks (e.g., the IP-PDN) by being the point of entry/exit of traffic for the UE 110. As is known, a given UE 110 may have simultaneous connectivity with more than one PGW 103 for accessing multiple PDNs.

The PGW 103 also performs policy enforcement, packet filtering for UEs 110, charging support, lawful interception and packet screening, each of which are well-known functions. The PGW 103 also acts as the anchor for mobility upon SGW relocation during handovers within LTE network, as well as between 3GPP and non-3GPP technologies, such as Worldwide Interoperability for Microwave Access (WiMAX) and 3$^{rd}$ Generation Partnership Project 2 (3GPP2 (code division multiple access (CDMA) 1X and Enhanced Voice Data Optimized (EvDO)).

Still referring to FIG. 1, eNB 105 is also operatively coupled to the MME 108. The MME 108 is the control-node for the EUTRAN, and is responsible for idle mode UE 110 paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs 110 by interacting with a Home Subscriber Server (HSS), which is not shown in FIG. 1.

Non Access Stratum (NAS) signaling terminates at the MME 108, and is responsible for generation and allocation of temporary identities for UEs 110. The MME 108 also checks the authorization of a UE 110 to camp on a service provider's Public Land Mobile Network (PLMN), and enforces UE 110 roaming restrictions. The MME 108 is the termination point in the network for ciphering/integrity protection for NAS signaling, and handles security key management.

The MME 108 also provides control plane functionality for mobility between LTE and 2G/3G access networks with an S3 type of interface from the SGSN (not shown) terminating at the MME 108.

The Policy and Charging Rules Function (PCRF) 106 is the entity that makes policy decisions and sets charging rules. It has access to subscriber databases and plays a role in the 3GPP architecture as specified in 3GPP TS 23.203 "Policy and Charging Control Architecture." The network management function (NMF) 107 is the entity that controls operations of the Radio Access Network.

The IP-PDN 1001 network may include an application function (AF) 109. The Application Function (AF) 109 is an entity that is application aware and is an ultimate receiver of exported eNB data that may be used to more effectively deliver content to the UE 110 to improve and/or optimize the network 10. AF 109 may alternatively or additionally be positioned inside the UE 110.

FIG. 2 illustrates a conventional E-UTRAN Node B (eNB) 105. The eNB 105 includes: a memory 240; a processor 220; a scheduler 210; wireless communication interfaces 260; Radio Link Control (RLC) and Medium Access Control (MAC) layer control 230 for each bearer; and a backhaul interface 235. The RLC and MAC layer control 230 is responsible for RLC and MAC layer protocol signaling, as defined by the 3GPP standards. The processor or processing circuit 220 controls the function of eNB 105 (as described herein), and is operatively coupled to the memory 240 and the communication interfaces 260. While only one processor 220 is shown in FIG. 2, it should be understood that multiple processors may be included in a typical eNB 105. The functions performed by the processor may be implemented using hardware. Such hardware may include one or more Central Processing Units (CPUs), digital signal processors (DSPs), application-specific-integrated-circuits, field programmable gate arrays (FPGAs)

computers or the like. The term processor, used throughout this document, may refer to any of these example implementations, though the term is not limited to these examples. With a Virtual Radio Access Network (VRAN) architecture various functions eNB components may be distributed across multiple processing circuits and multiple physical nodes within VRAN cloud.

The eNB 105 may include one or more cells or sectors serving UEs 110 within individual geometric coverage sector areas. Each cell individually may contain elements depicted in FIG. 2. Throughout this document the terms eNB, cell or sector shall be used interchangeably.

Still referring to FIG. 2, the communication interfaces 260 include various interfaces including one or more transmitters/receivers connected to one or more antennas to wirelessly transmit/receive control and data signals to/from UEs 110, or via a control plane. Backhaul interface 235 is the portion of eNB 105 that interfaces with SGW 101, MME 108, other eNBs, or interface to other EPC network elements and/or RAN elements within IP-CAN 100. The scheduler 210 schedules control and data communications that are to be transmitted and received by the eNB 105 to and from UEs 110. The memory 240 may buffer and store data that is being processed at eNB 105, transmitted and received to and from eNB 105.

Every Transmission Time Interval (TTI), typically equal to 1 millisecond, the scheduler 210 may allocate a certain number of Physical Resource Blocks (PRBs) to different bearers carrying data over the wireless link in the downlink direction (i.e., transmitting buffered data from eNB 105 to UE 110) and uplink direction (i.e., receiving data at eNB 105 from UE 110, which is received over backhaul 235). A "bearer" may be understood to be a virtual link, channel, or data flow used to exchange information for one or more applications on the UE 110. The scheduler 210 may determine Modulation and Coding Schema (MCS) that may define how many bits of information may be packed into the allocated number of PRBs.

Scheduler 210 may make PRB allocation decisions based upon a Quality of Service (QoS) Class Identifier (QCI), which represents traffic priority hierarchy. There are nine QCI classes currently defined in LTE, with 1 representing highest priority and 9 representing the lowest priority. QCIs 1 to 4 are reserved for Guaranteed Bitrate (GBR) classes for which the scheduler maintains certain specific data flow QoS characteristics. QCIs 5 to 9 are reserved for various categories of Best Effort traffic.

Conventionally, cyclic shift distortion due to uplink frequency offset may impact a received power delay profile during long-term evolution (LTE) physical random access channel (PRACH) detection between a UE 110 and an eNB 105. This distortion may create false alarm peaks where a relative amplitude to the correct peak depends on a frequency offset. For example, when an uplink frequency offset exceeds half of the PRACH subcarrier spacing (i.e., +/−0.625 KHz), the false alarm peaks may exceed the correct peak. In order to retain an acceptable false alarm rate and maintain a high detection performance for a high-speed UE 110 with large uplink frequency offsets, LTE standard 3GPP TS 36.211, 'E-UTRA: Physical Channels and Modulation,' V12.5.0 (2015-03), specifies a cyclic shift restricted set that can mask some cyclic shift positions in a Zadoff-Chu (ZC) root sequence. The cyclic shift restricted set may be effective when uplink frequency offset is within the PRACH subcarrier spacing (i.e., +/−1.25 KHz).

In order to access the LTE network, a UE 110 needs first to send a physical layer random access preamble through LTE physical random access channel (PRACH) to the eNB 105. The set of preamble sequences the UE 110 is allowed to use is generally configured by the network.

Conventionally, each physical layer random access preamble contains a cyclic-shifted Zadoff-Chu sequence that is generated from a root Zadoff-Chu sequence. As defined in TS 36.211, the $u^{th}$ root Zadoff-Chu sequence is expressed as follows.

$$x_u(n) = e^{-j\frac{\pi u n(n+1)}{N_{ZC}}}, 0 \le n \le N_{ZC} - 1 \quad \text{Equation 1}$$

Where the $N_{ZC}$ is conventionally called the length of the Zadoff-Chu sequence ($N_{ZC}$ is 839 for Preamble format 0 to Preamble format 3).

As defined in TS 36.211, from the $u^{th}$ root Zadoff-Chu sequence, random access preambles are defined by cyclic shifts $C_v$ according to the following.

$$x_{u,v}(n) = x_u((n+C_v) \bmod N_{ZC}) \quad \text{Equation 2}$$

Where the cyclic shift $C_v$ for a unrestricted set may be given by the following equation.

$$C_v = \begin{cases} 0, & N_{CS} = 0 \\ vN_{CS}(v = 0, 1, \ldots, \lfloor N_{ZC}/N_{CS} \rfloor - 1, & N_{CS} \ne 0 \end{cases} \quad \text{Equation 3}$$

The parameter $N_{CS}$ is a configured cyclic shift value used for random access preamble generation.

In order to determine which random access preamble is sent by the UE 110, the eNB 105 needs to correctly determine which Zadoff-Chu sequence is included in the received random access preamble. Thus, the eNB 105 needs to determine correctly the cyclic shifts $C_v$ of the Zadoff-Chu sequence used for the random access preamble.

For a UE 110 travelling at high speed, there may be a large uplink frequency offset in the random access preamble received by the eNB 105 due to the impact of Doppler shift. The uplink frequency offset caused by the high speed may cause the distortion of the received PRACH preamble. For example, when the uplink frequency offset is near the PRACH subcarrier spacing), a transmitted preamble using a Zadoff-Chu sequence with the cyclic shift $C_v$ may be falsely detected as a preamble using another Zadoff-Chu sequence with the cyclic shifts $C_v \pm d_u$ where $d_u$ is a cyclic shift associated with the root Zadoff-Chu sequence index u, which will be further discussed in Equation 7. For preamble formats 0-3, the PRACH subcarrier spacing is conventionally defined as 1.25 KHz (see Table 5.7.3-1 of 3GPP TS 36.211, 'E-UTRA: Physical Channels and Modulation'). For a preamble format of 4, the PRACH subcarrier spacing is conventionally defined as 7.5 KHz (see Table 5.7.3-1 of 3GPP TS 36.211). Because it is highly unlikely that the uplink Doppler frequency will reach 7.5 KHz, it is presumed for purposes of this document that the PRACH preamble formats 0-3 will be of primary concern.

In order to avoid the false detection problem due to uplink frequency offset, LTE standard 3GPP TS 36.211 ('E-UTRA: Physical Channels and Modulation') defines a conventional restricted set of cyclic shifts for cells serving high speed UEs 110. The conventional restricted set of cyclic shifts work by removing the cyclic shifts, which may cause detection ambiguity, from the unrestricted set of cyclic shifts (see Equation 3). For example, if a cyclic shift $C_v$ is included in the restricted set, then the cyclic shifts $C_v \pm d_u$ are purposely excluded from the restricted set. In this way, if the eNB 105 detects a preamble with cyclic shifts $C_v \pm d_u$, the eNB 105 understands the reason for receiving preamble with cyclic shifts $C_v \pm d_u$ is due to Doppler impact, since cyclic shifts $C_v \pm d_u$ are excluded from the restricted set. In this way, the eNB 105 may correctly identify that the preamble is transmitted with cyclic shift $C_v$. The restricted sets of cyclic shifts in TS 36.211 are designed to cover the frequency offset up to RACH subcarrier spacing, i.e., 1.25 KHz.

In many countries, high speed trains (HSTs) are now travelling faster than 300 km/h. For instance, in Japan HSTs may travel at 320 km/h, in Germany HSTs may travel at 330 km/h, in Italy HSTs may travel at 400 km/h, and in China HSTs may travel at 430 km/h. For trains traveling over 300 km/h, the uplink frequency offset may far exceed the PRACH subcarrier spacing 1.25 KHz. For example, for a carrier frequency of 2.6 GHz, and a train speed of 430 km/h, the uplink frequency offset caused by Doppler shift alone will be 2.070 KHz. Thus, the conventional cyclic shift restricted set defined in 3GPP TS 36.211 may no longer be suitable for these HST scenarios, and thus a new cyclic shift restricted set needs to be introduced to support uplink frequency offset far exceeding the PRACH subcarrier spacing of 1.25 KHz.

SUMMARY OF INVENTION

At least one example embodiment relates to a method.

In one embodiment, the method includes obtaining, by one or more processors of at least one network node, first configuration parameters for physical random access channel (PRACH) preambles, the first configuration parameters including a first preamble format, a zero correlation zone configuration index, and a list of physical root Zadoff-Chu sequence indexes; generating, by the one or more processors, a set of cyclic shifts corresponding to a first frequency offset based on the first preamble format, the zero correlation zone configuration index, and the list of physical root Zadoff-Chu sequence indexes; and exporting, by the one or more processors, second configuration parameters to control network traffic, the second configuration parameters including the set of cyclic shifts.

In one embodiment, the first frequency offset is at least twice a PRACH subcarrier spacing.

In one embodiment, the first frequency offset is in a range of about −2.5 KHz to +2.5 KHz.

In one embodiment, the second configuration parameters further includes the first preamble format, the zero correlation zone configuration index, and the list of physical root Zadoff-Chu sequence indexes.

In one embodiment, the first preamble format includes a first random access preamble sequence length, the generating of the set of cyclic shifts being accomplished based on the first random access preamble sequence length of the first preamble format.

In one embodiment, the method further comprises determining that a user equipment associated with a first physical random access channel (PRACH) is traveling at a rate of speed of 300 km/h or greater, wherein the PRACH preambles are associated with the first PRACH.

In one embodiment, each index in the list of physical root Zadoff-Chu sequence indexes identifies a root Zadoff-Chu sequence, wherein the generating of the set of cyclic shifts includes calculating a plurality of cyclic-shifted Zadoff-Chu sequences using the root Zadoff-Chu sequences, wherein each of the plurality of cyclic-shifted Zadoff-Chu sequences is used to generate one cyclic shift of the set of cyclic shifts.

In one embodiment, the PRACH subcarrier spacing is 1.25 KHz.

At least one example embodiment relates to a method including detecting, by the one or more processors, a physical random access channel (PRACH) preamble with a frequency offset that is at least twice a PRACH subcarrier spacing.

In one embodiment, the frequency offset is in a range of about −2.5 KHz to +2.5 KHz.

In one embodiment the detecting of the PRACH preamble is accomplished using five PRACH detection windows corresponding to Zadoff-Chu sequences with frequency offsets in a range of about −2.5 KHz to +2.5 KHz.

At least one example embodiment relates to a network node.

In one embodiment, the network node includes one or more processors configured to, obtain first configuration parameters for physical random access channel (PRACH) preambles, the first configuration parameters including a first preamble format, a zero correlation zone configuration index, and a list of physical root Zadoff-Chu sequence indexes, generate a set of cyclic shifts corresponding to a first frequency offset based on the first preamble format, the zero correlation zone configuration index, and the list of physical root Zadoff-Chu sequence indexes, and export second configuration parameters to control network traffic, the second configuration parameters including the set of cyclic shifts.

In one embodiment, the first frequency offset is at least twice a PRACH subcarrier spacing.

In one embodiment, the first frequency offset is in a range of about −2.5 KHz to +2.5 KHz.

In one embodiment, the second configuration parameters further include the first preamble format, the zero correlation zone configuration index, and the list of physical root Zadoff-Chu sequence indexes.

In one embodiment, the first preamble format includes a first random access preamble sequence length, and the one or more processors is further configured to generate the set of cyclic shifts based on the first random access preamble sequence length of the first preamble format.

In one embodiment, the one or more processors is further configured to, determine that a user equipment associated with a first physical random access channel (PRACH) is traveling at a rate of speed of 300 km/h or greater, wherein the PRACH preambles are associated with the first PRACH.

In one embodiment, each index in the list of physical root Zadoff-Chu sequence indexes identifies a root Zadoff-Chu sequence, the one or more processors being further configured to generate the set of cyclic shifts by calculating a plurality of cyclic-shifted Zadoff-Chu sequences using the root Zadoff-Chu sequences, wherein each of the plurality of cyclic-shifted Zadoff-Chu sequences is used to generate one cyclic shift of the set of cyclic shifts.

At least one example embodiment relates to a network node including one or more processors configured to, detect a physical random access channel (PRACH) preamble with a frequency offset that is at least twice a PRACH subcarrier spacing.

In one embodiment, the frequency offset is in a range of about −2.5 KHz to +2.5 KHz.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 illustrates a conventional 3$^{rd}$ Generation Partnership Project long-Term Evolution (3GPP LTE) network;

FIG. 2 illustrates a conventional E-UTRAN Node B (eNB);

FIG. 4 illustrates cyclic shift assignments for a conventional restricted set;

DETAILED DESCRIPTION

Figure 3:
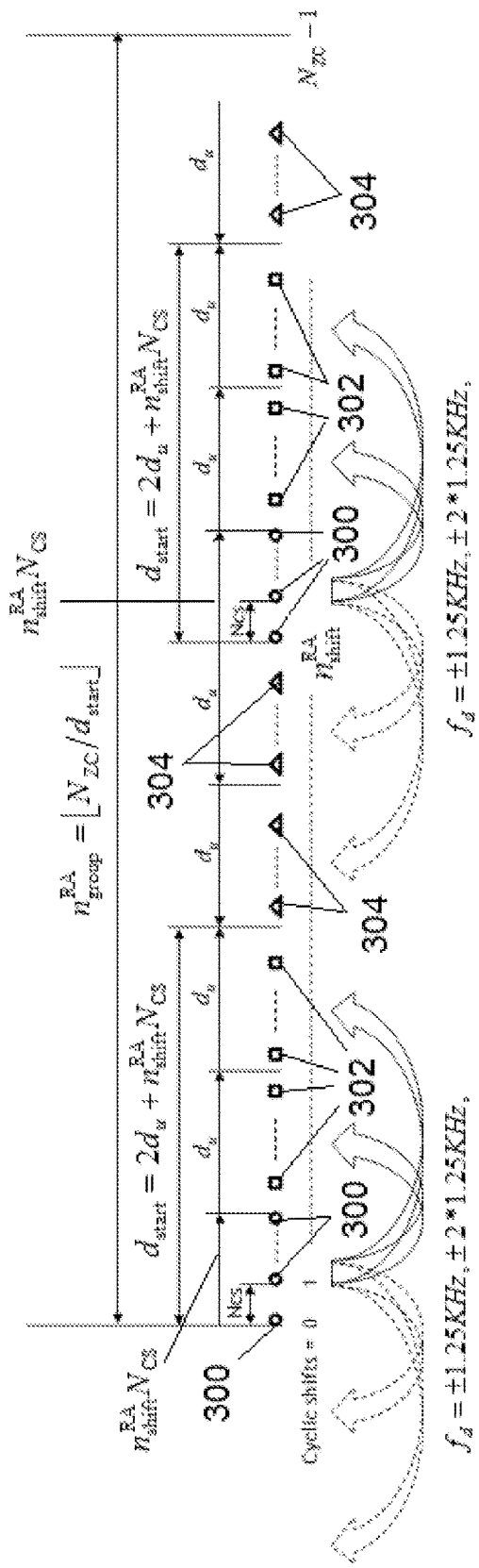
FIG. 3 illustrates cyclic shift assignments for the proposed new restricted set, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

General Methodology:

In order to access the LTE network, a user equipment (UE) 110 may first send a physical layer random access preamble through an LTE physical random access channel (PRACH) to the eNB 105. The set of preamble sequences the UE may be allowed to use may be configured by the network. An example embodiment generates a new cyclic shift restricted set that may be capable of supporting an uplink frequency offset that may be set to be at least twice the PRACH subcarrier spacing (as discussed above). Additionally, an example embodiment may allow detection of a PRACH preamble when an uplink frequency offset may be at least twice the PRACH subcarrier spacing (namely, the uplink frequency offset may be at least +/−2.5 KHz).

The PRACH subcarrier spacing is defined as 1.25 KHz for PRACH preamble format values of 0-3 (as defined in Table 5.7.3-1 of 3GPP TS 36.211, "E-UTRA: Physical Channels and Modulation," V12.5.0 (2015-03)). Thus, the generated new cyclic shift restricted set that may be capable of supporting an uplink frequency offset, at least, up to the range [−2.5 KHz, +2.5 KHz]. Similarly, an example embodiment for PRACH detection may allow detection of a PRACH preamble when an uplink frequency offset may be, at least, up to a range of [−2.5 KHz, +2.5 KHz]. It is noted that, for a PRACH preamble value of 4, the subcarrier spacing is 7.5 KHz. Because it is unlikely that an uplink Doppler frequency will reach 7.5 KHz, for purposes of the example embodiment the PRACH preamble format values of 0-3 are of primary concern.

For high-speed train (HST) scenarios, an uplink frequency offset caused by Doppler shift in the PRACH preambles may far exceed the conventional +/−1.25 KHz offset, depending on the train speed and carrier frequency. For example, if the carrier frequency is 2.6 GHz with train speed of 430 km/h, the uplink frequency offset caused by Doppler shift alone will be +/−2.070 KHz. Thus, example embodiments include a method for the generation of a new cyclic shift restricted set that is capable of supporting uplink frequency offset up to twice of the PRACH subcarrier spacing, namely +/−2.5 KHz. The new cyclic shift restricted set may be utilized for such HST scenarios.

Each PRACH preamble may contain a cyclic-shifted Zadoff-Chu sequence that may be generated from a root Zadoff-Chu sequence. In 3GPP TS 36.211, the $u^{th}$ root Zadoff-Chu sequence for PRACH preambles may be defined as follows.

$$x_u(n) = e^{-j\frac{\pi u n(n+1)}{N_{ZC}}}, 0 \le n \le N_{ZC} - 1 \quad \text{Equation 4}$$

Where the $N_{ZC}$ is called the length of the Zadoff-Chu sequence ($N_{ZC}$ is 839 for Preamble format 0 to Preamble format 3).

Random access preambles may be created from the root Zadoff-Chu sequence by the following cyclic shifts.

$$x_{u,v}(n)=x_u((n+C_v)\bmod N_{ZC}) \quad \text{Equation 5}$$

Where $C_v$ may be the cyclic shift. For an eNB 105 serving a slow moving UE 110, the unrestricted set of cyclic shifts $C_v$ may be used, which may be determined as follows.

$$C_v = \begin{cases} 0, & N_{CS} = 0 \\ vN_{CS}(v = 0, 1, \ldots, \lfloor N_{ZC}/N_{CS} \rfloor - 1, & N_{CS} \ne 0 \end{cases} \quad \text{Equation 6}$$

Where the parameter $N_{CS}$ may be an eNB 105 configured cyclic shift value used for random access preamble generation.

For a UE 110 travelling at high speed, there may be a large uplink frequency offset in the received random access preamble at the eNB 105 due to the impact of Doppler shift. The uplink frequency offset may cause the distortion of the received PRACH preamble. For example, when the uplink frequency offset is near the PRACH subcarrier spacing of +/−1.25 KHz, a transmitted preamble using a Zadoff-Chu sequence with the cyclic shift $C_v$ will be falsely detected as another preamble using another Zadoff-Chu sequence with the cyclic shifts $C_v \pm d_u$ where $d_u$ may correspond to the frequency offset of the PRACH subcarrier spacing $f_d = \pm 1.25$ KHz for the $u^{th}$ root Zadoff-Chu sequence.

In order to avoid the false detection problem due to uplink frequency offset, TS 36.211 defines the restricted set of cyclic shifts for cells serving high speed UEs 110. The restricted set of cyclic shifts work by removing the cyclic shifts that may cause detection ambiguity from the unrestricted set of cyclic shifts (See Equation 3). For example, if a cyclic shift $C_v$ is included in the restricted set, then the cyclic shifts $C_v \pm d_u$ may be purposely excluded from the restricted set. In this way, if the BS detects a preamble with cyclic shifts $C_v \pm d_u$, the eNB 105 understands the reason for receiving the preamble with cyclic shifts $C_v \pm d_u$ is due to Doppler impact, since cyclic shifts $C_v \pm d_u$ may be excluded from the restricted set. In this way, the eNB 105 may correctly identify the preamble that is transmitted with cyclic shift $C_v$. A restricted set of the cyclic shifts for the $u^{th}$ root Zadoff-Chu sequence may be derived based on the cyclic shift $d_u$. For the $u^{th}$ root Zadoff-Chu sequenceZC root sequence, $d_u$ is given by 3GPP TS 36.211, as follows.

$$d_u = \begin{cases} r & 0 \le r < N_{ZC}/2 \\ N_{ZC} - r & \text{otherwise} \end{cases} \quad \text{Equation 7}$$

Where p may be the smallest non-negative integer that fulfils $(ru) \bmod N_{ZC}=1$. Based on the cyclic shift $d_u$, the following restricted set of the cyclic shifts may be created by masking other cyclic shifts in an unrestricted set, as given by 3GPP TS 36.211.

$$C_v = d_{start} \lfloor v/n_{shift}^{RA} \rfloor + (v \bmod n_{shift}^{RA}) N_{CS} \, v=0,1,\ldots,n_{shift}^{RA} n_{group}^{RA} + \bar{n}_{shift}^{RA} - 1 \quad \text{Equation 8}$$

Where the parameters $n_{shift}^{RA}, d_{start}, n_{group}^{RA}, \bar{n}_{shift}^{RA}$ for restricted sets of cyclic shifts may be derived from $d_u$ as follows.

For $N_{CS} \le d_u < N_{ZC}/3$, the parameters may be given by the following.

$$n_{shift}^{RA} = \lfloor d_u/N_{CS} \rfloor \quad \text{Equation 9}$$

$$d_{start} = 2d_u + n_{shift}^{RA} N_{CS} \quad \text{Equation 10}$$

$$n_{group}^{RA} = \lfloor N_{ZC}/d_{start} \rfloor \quad \text{Equation 11}$$

$$\bar{n}_{shift}^{RA} = \max(\lfloor N_{ZC} - 2d_u - n_{group}^{RA} d_{start})/N_{CS} \rfloor, 0) \quad \text{Equation 12}$$

For $N_{ZC}/3 \le d_u \le (N_{ZC} - N_{CS})/2$, the parameters may be given by the following.

$$n_{shift}^{RA} = \lfloor (N_{ZC} - 2d_u)/N_{CS} \rfloor \quad \text{Equation 13}$$

$$d_{start} = N_{ZC} - 2d_u + n_{shift}^{RA} N_{CS} \quad \text{Equation 14}$$

$$n_{group}^{RA} = \lfloor d_u/d_{start} \rfloor \quad \text{Equation 15}$$

$$\bar{n}_{shift}^{RA} = \min(\max(\lfloor d_u - n_{group}^{RA} d_{start})/N_{CS} \rfloor, 0), n_{shift}^{RA}) \quad \text{Equation 16}$$

For all other values of $d_u$, there are no cyclic shifts in the restricted set.

The restricted set of cyclic shifts in TS 36.211 are designed to cover the frequency offset up to RACH subcarrier spacing, i.e., 1.25 KHz by removing the cyclic shifts $C_v \pm d_u$ for every cyclic shift $C_v$ that is included in the restricted set.

The above restricted sets may make it possible to retain an acceptable false alarm rate, while maintaining a high detection performance for high-speed UEs 110 when the uplink frequency offset is within +/−1.25 KHz.

In many countries, high speed trains (HSTs) are now travelling faster than 350 km/h. The uplink frequency offset caused by Doppler shift alone may reach over 2 KHz. Thus, the cyclic shift restricted set currently defined in 3GPP TS 36.211 may no longer be suitable for these HST scenarios, and thus a new cyclic shift restricted set needs to be introduced to support uplink frequency offset far exceeding the PRACH subcarrier spacing of 1.25 KHz.

In order to support uplink frequency offset up to twice the PRACH subcarrier spacing, a new restricted set of cyclic shifts may be defined. When the uplink frequency offset reaches twice the PRACH subcarrier spacing, a transmitted PRACH preamble with a cyclic shift $C_v$ may be detected as another PRACH preamble with another cyclic shift $C_v \pm 2d_u$. Thus, if the UE 110 is allowed to transmit a PRACH preamble with $C_v$ and $C_v \pm 2d_u$, the eNB 105 may detect a PRACH preamble with $C_v \pm 2d_u$ for multiple situations: a) if a stationary UE 110 sends a PRACH preamble with cyclic shift $C_v \pm 2d_u$, and b) if a HST UE 110 sends a PRACH preamble with cyclic shift $C_v$ and uplink frequency offset up to twice the PRACH subcarrier spacing.

Thus, if the UE 110 is allowed to transmit a PRACH preamble with $C_v$ and $C_v \pm 2d_u$, and the uplink frequency offset can be up to twice the PRACH subcarrier spacing, the eNB 105 may not know whether the UE sent a PRACH preamble with $C_v$ or the UE 110 sent a PRACH preamble with $C_v \pm 2d_u$, in case the eNB 105 detects a PRACH preamble with $C_v \pm 2d_u$.

Therefore, in order to support the uplink frequency offset by increasing the PRACH subcarrier spacing, for every cyclic shift $C_v$ included in the restricted set, not only the cyclic shifts $C_v \pm d_u$, but also cyclic shifts $C_v \pm 2d_u$ may be excluded from the restricted set in order to avoid the ambiguity in PRACH preamble detection caused by the uplink frequency offset up to twice the PRACH subcarrier spacing.

Therefore, the $d_{start}$, which is given by Equation 10 for supporting uplink frequency offset up to the PRACH subcarrier spacing, may no longer be suitable for supporting uplink frequency offset with PRACH subcarrier spacing up to +/−2.5 KHz. Therefore, the spacing may be increased from $d_{start}=(2d_u+n_{shift}^{RA}N_{CS})$ to $d_{start}=(4d_u+n_{shift}^{RA}N_{CS})$. In FIG. 3, the first group of cyclic shifts ($C_v$) 300 may be included in the restricted set, the second set of cyclic shifts 302 may be excluded from the new restricted set due to their cyclic shifts that are $C_v+d_u$ or $C_v+2d_u$, and the third group of cyclic shifts 304 represent the cyclic shifts that may be excluded from the new restricted set due to their cyclic shifts that are $C_v-d_u$ or $C_v-2d_u$, for the same reason mentioned above for the conventional restricted set in order to avoid the false alarm caused by the detection ambiguity. Thus, the cyclic shift distance between the two cyclic shift groups in the restricted set may first be increased to account for the $2d_u$ on each side of the cyclic shift groups, as illustrated in FIG. 3.

With the change of $d_{start}=(2d_u+n_{shift}^{RA}N_{CS})$ to $d_{start}=(4d_u+n_{shift}^{RA}N_{CS})$, when eNB 105a (see FIG. 9) detects the maximum correction of received PRACH preamble with a Zadoff-Chu sequence with a cyclic shift represented by the second set of cyclic shifts 302 or the third group of cyclic shifts 304, the eNB 105a may understand this situation is caused by uplink frequency offset, and the real preambles sent from UE 110 may be the corresponding first group of cyclic shifts 300.

Additionally, based on the consideration that at least one group of cyclic shift needs to be included in the new restricted set (i.e., $n_{group}^{RA}=\lfloor N_{ZC}/d_{start} \rfloor=\lfloor N_{ZC}/((4d_u+n_{shift}^{RA}N_{CS})) \rfloor \ge 1$), the condition of $N_{CS} \le d_u < N_{ZC}/3$ for the current (conventional) restricted set will no longer be valid for the new restricted set. Instead, the condition will need to be changed to $N_{CS} \le d_u < N_{ZC}/5$ in order to make sure there is at least one group of cyclic shift included in the new restricted set.

Therefore, for $N_{CS} \le d_u < N_{ZC}/5$, the parameters $n_{shift}^{RA}$, $d_{start}, n_{group}^{RA}, \bar{n}_{shift}^{RA}$, which are used for the calculation of the cyclic shifts for the new restricted set supporting uplink frequency offset up to the PRACH subcarrier spacing, may be determined by.

$$n_{shift}^{RA} = \lfloor d_u/N_{CS} \rfloor \quad \text{Equation 17}$$

$$d_{start} = 4d_u + n_{shift}^{RA} N_{CS} \quad \text{Equation 18}$$

$$n_{group}^{RA} = \lfloor N_{ZC}/d_{start} \rfloor \quad \text{Equation 19}$$

$$\bar{n}_{shift}^{RA} = \max(\lfloor N_{ZC} - 4d_u - n_{group}^{RA} d_{start})/N_{CS} \rfloor, 0) \quad \text{Equation 20}$$

The calculation of $n_{shift}^{RA}, d_{start}, n_{group}^{RA}, \bar{n}_{shift}^{RA}$ with Equations 13-16 for the current (conventional) restricted set, when $N_{ZC}/3 \leq d_u \leq (N_{ZC}-N_{CS})/2$, may be explained with respect to FIG. 4. As shown in FIG. 4, the cyclic shifts may be assigned in groups when $N_{ZC}/3 \leq d_u \leq (N_{ZC}-N_{CS})/2$. Specifically, there are $n_{group}^{RA} = \lfloor d_u/d_{start} \rfloor$ groups of the cyclic shifts (a first group of cyclic shifts 300) with a distance between two cyclic shifts groups that may be defined as $d_{start} = N_{ZC}-2d_u+n_{shift}^{RA}N_{CS}$. The number of cyclic shifts may be $n_{shift}^{RA} = \lfloor (N_{ZC}-2d_u)/N_{CS} \rfloor$ for each group Similar to FIG. 3, the second set of cyclic shifts 302 and third set of cyclic shifts 304 represent the cyclic shifts which may be excluded from the restricted set due to their relative cyclic shifts $\pm d_u$ to the first group of cyclic shifts 300, which may be included in the restricted set, with a corresponding frequency offset of the PRACH subcarrier spacing being $f_d = \pm 1/T_{SEQ} = \pm 1.25$ KHz. Contrary to FIG. 3, FIG. 4 also shows an additional (fourth) group of cyclic shifts 400 that may also be excluded from the restricted set. The reason for excluding the group of cyclic shifts 400 from the restricted set is not because of their relative cyclic shifts $\pm d_u$ to the first group of cyclic shifts 300, but because their relative cyclic shift $d_u$ to the cyclic shifts are represented by the third set of cyclic shifts 304.

The reason for excluding the fourth group of cyclic shifts 400 from the restricted set is that these cyclic shifts may also create ambiguity in preamble detection when uplink frequency offset may be near the PRACH subcarrier frequency of +/-1.25 KHz. If the fourth group of cyclic shifts 400 were included in the restricted set, a detection of the third group of cyclic shifts 304 could mean either: a) the UE 110 has sent a preamble with the cyclic shift represented by fourth set of cyclic shifts 400 with a large frequency offset causing cyclic shift distortion close to $d_u$; or 2) the UE 110 has sent a preamble with the shift represented by the first group of cyclic shifts 300 with a large frequency offset causing cyclic shift distortion close to $-d_u$. Due to the above consideration, the fourth group of cyclic shifts 400 may also be excluded from the restricted set.

For the new restricted set, the condition $N_{ZC}/3 \leq d_u \leq (N_{ZC}-N_{CS})/2$ for a conventional restriction set may first be changed to $N_{ZC}/5 \leq d_u \leq (N_{ZC}-N_{CS})/4$. When $d_u > (N_{ZC}-N_{CS})/4$, there may not be a suitable cyclic shift to be included in the new restricted set, because for a particular cyclic shift, the corresponding cyclic shifts with relative shifts of $+2d_u$ and $-2d_u$ will cross over each other.

Figure 5:
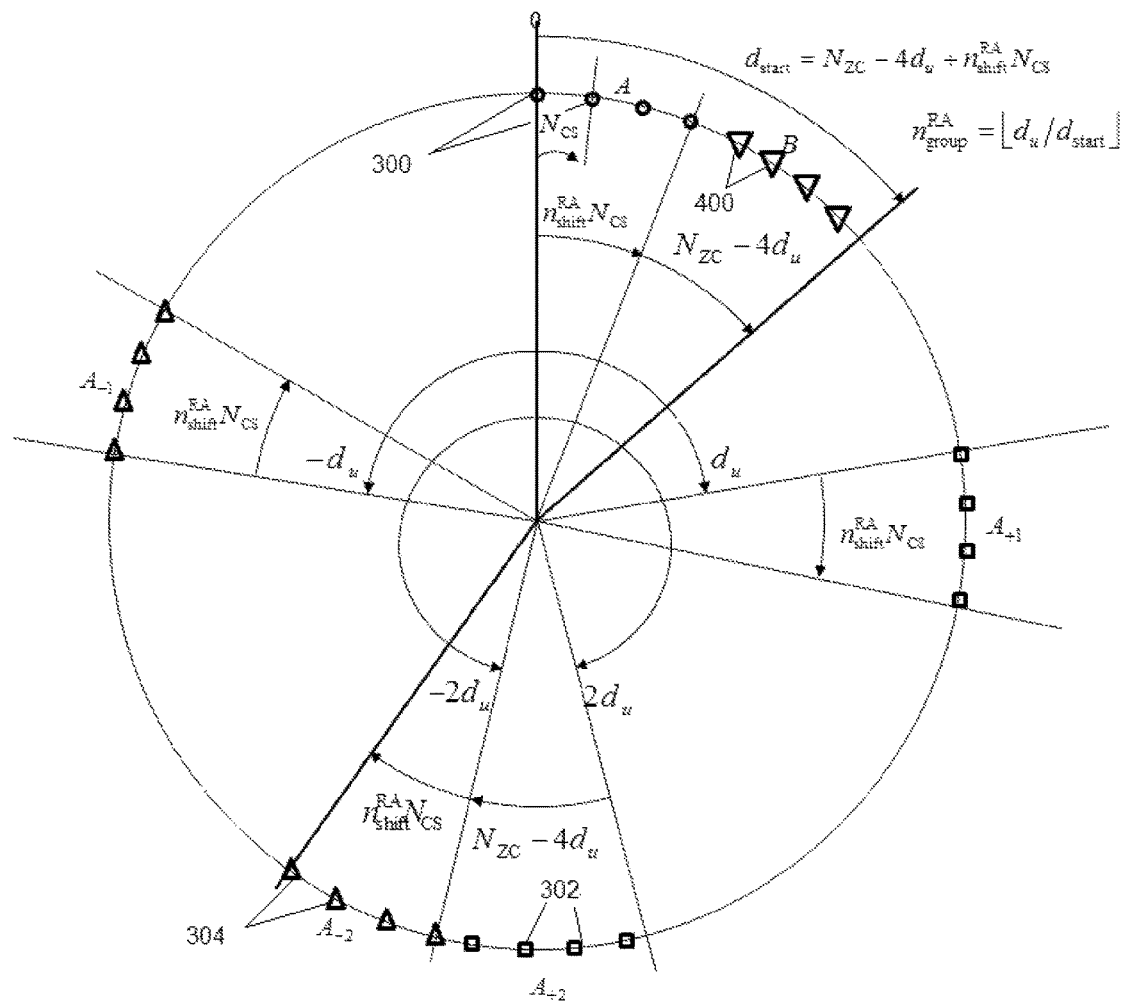
FIG. 5 illustrates cyclic shift assignments for the proposed new restricted set, in accordance with an example embodiment.

The cyclic shift assignments for $N_{ZC}/5 \leq d_u \leq (N_{ZC}-N_{CS})/4$ for the new restricted set are shown in FIG. 5, where the cyclic shifts 300 of the A cyclic shift groups may be included in the new restricted set. Cyclic shifts with relative cyclic shifts of $\pm d_u$ and $\pm 2d_u$ from the A cyclic shift groups may be masked to avoid the detection ambiguity. That is to say, the $A_{\pm 1}$ and $A_{\pm 2}$ cyclic shift groups, which have relative $\pm d_u$ and $\pm 2d_u$ cyclic shifts from the A cyclic shift groups, which may be represented as the second set of cyclic shifts 302 and the third set of cyclic shifts 304, may be excluded from the new restriction set. With uplink frequency offsets up to $\pm 2.5$ KHz, a transmitted PRACH preamble from the UE 110 with a cyclic shift in A cyclic shift groups may result in the eNB 105a detecting the maximum correction of a received PRACH preamble with a Zadoff-Chu sequence with a corresponding cyclic shift in $A_{\pm 1}$ or $A_{\pm 2}$ cyclic shift groups. Since cyclic shifts in $A_{\pm 1}$ or $A_{\pm 2}$ cyclic shift groups may be excluded from the new restricted set, the eNB 105a may understand this situation may be caused by frequency offset, and therefore the eNB 105a may be able to determine the real cyclic shift in A cyclic shift groups, since the UE 110 may be only allowed to use the cyclic shifts in A cyclic shift groups for the PRACH preambles.

In viewing FIG. 5, the cyclic shifts 400 in B cyclic shift groups (the fourth set of cyclic shifts) shall also be excluded from the new restriction set due to their relative cyclic shift to $A_{-1}$ groups is $d_u$. As explained before, a detection of PRACH preamble with cyclic shifts in $A_{-1}$ groups may result in detection ambiguity if B cyclic shift groups are included. Similarly, cyclic shifts with a relative shift to any of the $A_{-2}$ groups that is $d_u$, may also be removed from the new restricted set for the similar reasons as explained above.

Therefore, for $N_{ZC}/5 \leq d_u \leq (N_{ZC}-N_{CS})/4$, the cyclic shifts for the new restricted set may be defined as follows.

$$n_{shift}^{RA} = \lfloor (N_{ZC}-4d_u)/N_{CS} \rfloor \quad \text{Equation 21}$$

$$d_{start} = N_{ZC}-4d_u+n_{shift}^{RA}N_{CS} \quad \text{Equation 22}$$

$$n_{group}^{RA} = \lfloor d_u/d_{start} \rfloor \quad \text{Equation 23}$$

$$\bar{n}_{shift}^{RA} = \min(\max(\lfloor d_u - n_{group}^{RA} d_{start} \rfloor / N_{CS} \rfloor, 0), n_{shift}^{RA}) \quad \text{Equation 24}$$

For all other values of $d_u$, there may be no cyclic shifts in the new restricted set.

In order to perform the PRACH detection when uplink frequency offset in the range of $[-2.5$ KHz, $+2.5$ KHz$]$ with the above new restriction set for cyclic shifts, let us first take a look at the correlation of the received Zadoff-Chu sequence $x_{u,v}(n, f_d)$ with the Zadoff-Chu sequence $x_{u,v}(n)$, which is used for the generation of the transmitted preamble, and with the Zadoff-Chu sequences $x_{u,v}(n \pm pd_u)\{p=1,2\}$ with the cyclic shifts of $\pm p^*d_u \mod N_{ZC}, \{p=1,2\}$. The correlation results are depicted in FIG. 6.

Figure 6:
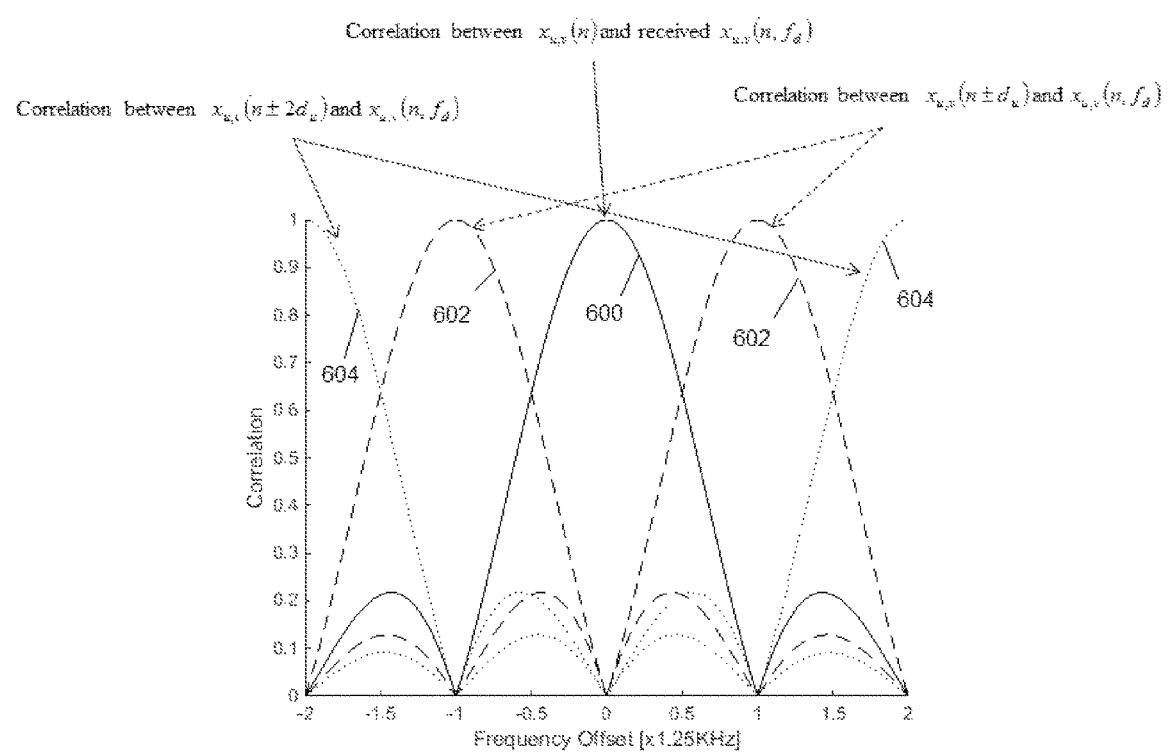
FIG. 6 illustrates the correlation of Zadoff-Zhu sequences, in accordance with an example embodiment.

Specifically, in FIG. 6, several observations may be noted. First, if the uplink frequency offset may be within the range of $[-0.5^*1.25$ KHz, $+0.5^*1.25$ KHz$]$, the received Zadoff-Chu sequence $x_{u,v}(n, f_d)$ may mainly be correlated with the Zadoff-Chu sequence $x_{u,v}(n)$ (see 600). Second, if the uplink frequency offset exceeds the range of $[-0.5^*1.25$ KHz, $+0.5^*1.25$ KHz$]$, but the offset is within $[-1.25$ KHz, $+1.25$ KHz$]$, the maximum correlation may take place with the cyclic shifted Zadoff-Chu sequence $x_{u,v}(n \pm d_u)$ (see 602). Third, when the frequency offset exceeds the range of $[-1.25$ KHz, $+1.25$ KHz$]$, but is still within $[-1.5^*1.25$ KHz, $+1.5^*1.25$ KHz$]$, the maximum correlation may still take place with the cyclic shifted Zadoff-Chu sequence $x_{u,v}(n \pm d_u)$ (see 602). However, when the frequency offset exceeds the range of $[-1.5^*1.25$ KHz, $+1.5^*1.25$ KHz$]$, the maximum correlation may take place with the cyclic shifted Zadoff-Chu sequence $x_{u,v}(n \pm 2d_u)$ (see 604).

Figure 7:
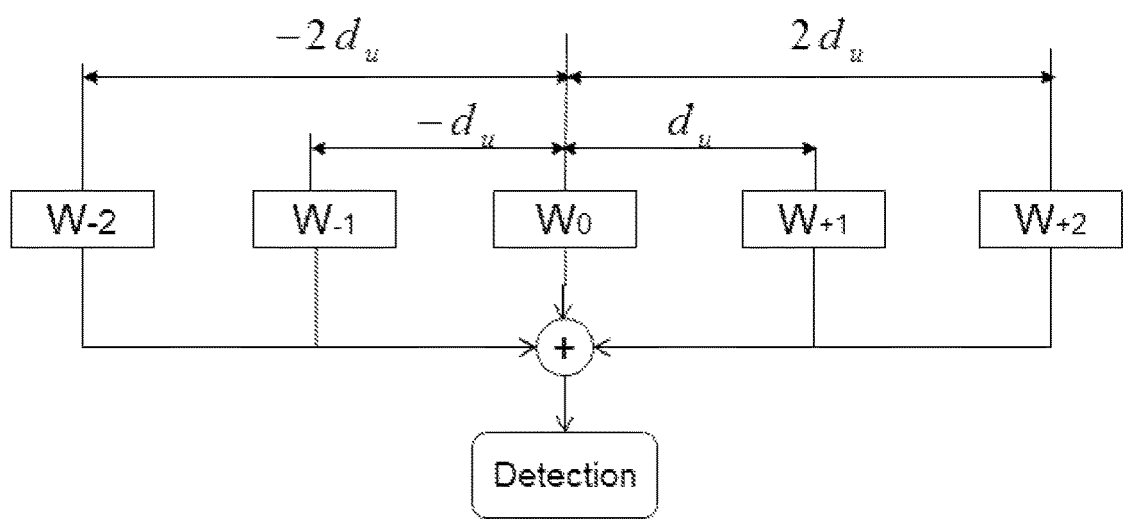
FIG. 7 illustrates the detection of PRACH preambles, in accordance with an example embodiment.

Therefore, to support PRACH detection for frequency offset of up to $-2.5$ KHz, $+2.5$ KHz, an example embodiment uses five detection widows, which correspond to the Zadoff-Chu sequences $x_{u,v}(n \pm pd_u)\{p=0,1,2\}$, as shown in FIG. 7, instead of a conventional three window detection approach, which corresponds to the Zadoff-Chu sequences $x_{u,v}(n \pm pd_u)\{p=0,1\}$ for supporting frequency offset of up to +/-1.25 KHz, as discussed for instance in S. Sesia, I. Toufik, and M. Baker, '*LTE—The UMTS Long Term Evolution,*' John Wiley & Sons, 2011.

In FIG. 7, $W_{\pm p}$ may denote the PRACH detection windows (identified as window $W_{-2}$, $W_{-1}$, etc.) corresponding to the Zadoff-Chu sequences $x_{u,v}(n \pm pd_u)\{p=0,1,2\}$. The received power delay profiles (PDP) from the five detection windows may be combined to arrive at the final PRACH detection results. With the new restriction set of the cyclic shifts, as defined above, the eNB 105a may be able to determine unambiguously the correct cyclic shift (i.e., the reference Zadoff-Chu sequence $x_{u,v}(n)$ with p=0) regardless of the maximum correlation that may take place within the detection window, since the cyclic shifts corresponding to $\pm p^*d_u \mod N_{ZC}\{p=1,2\}$ may be excluded from the restricted set, and thus, a detection of the Zadoff-Chu sequences $x_{u,v}(n \pm pd_u)\{p=1,2\}$, may be caused by the frequency offset, and the transmitted Zadoff-Chu sequence should be $x_{u,v}(n)$.

Figure 8:
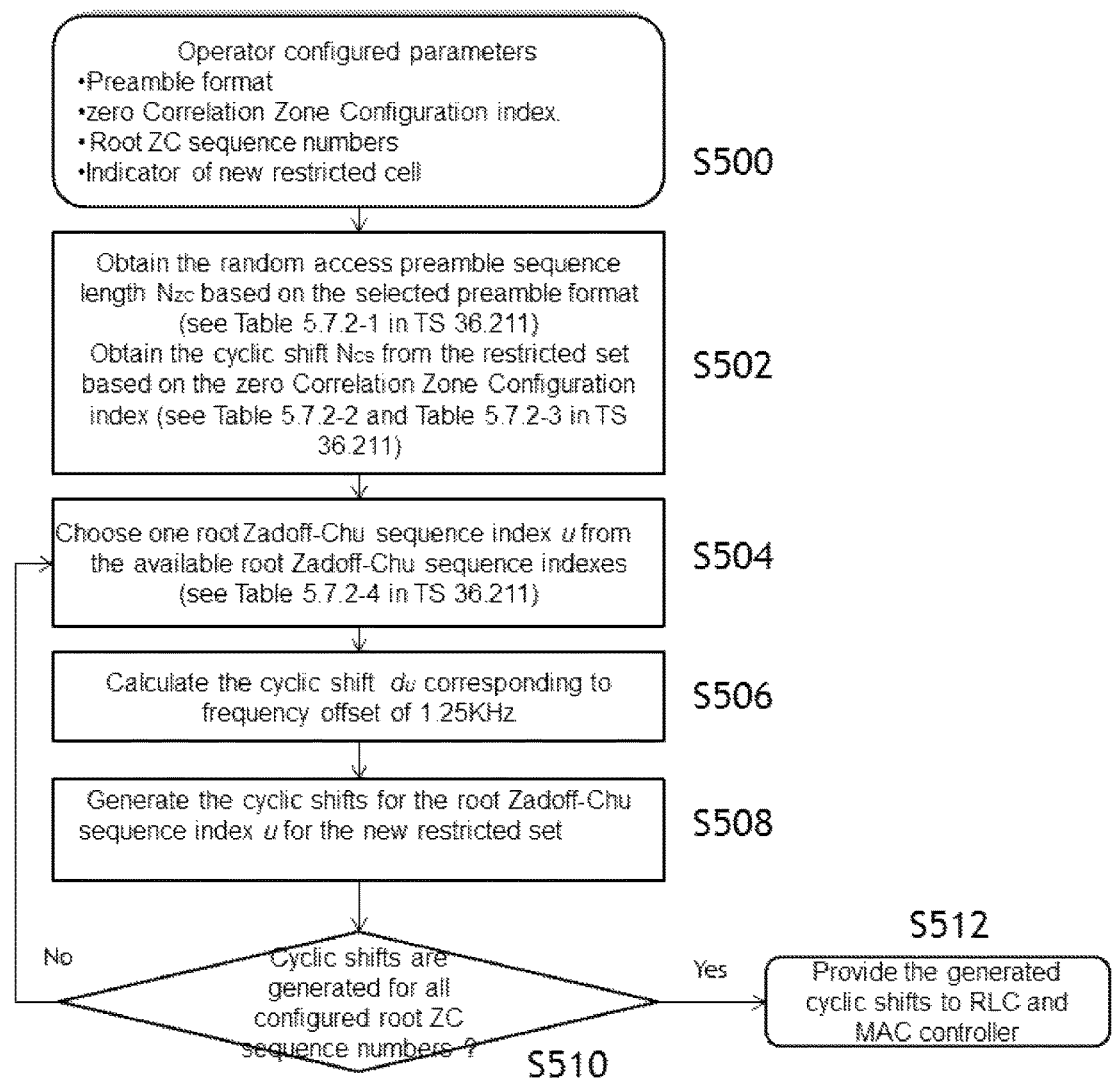
FIG. 8 is a method flowchart describing a method of determining a restricted set of cyclic shifts for a physical random access channel (PRACH), in accordance with an example embodiment.
Figure 9:
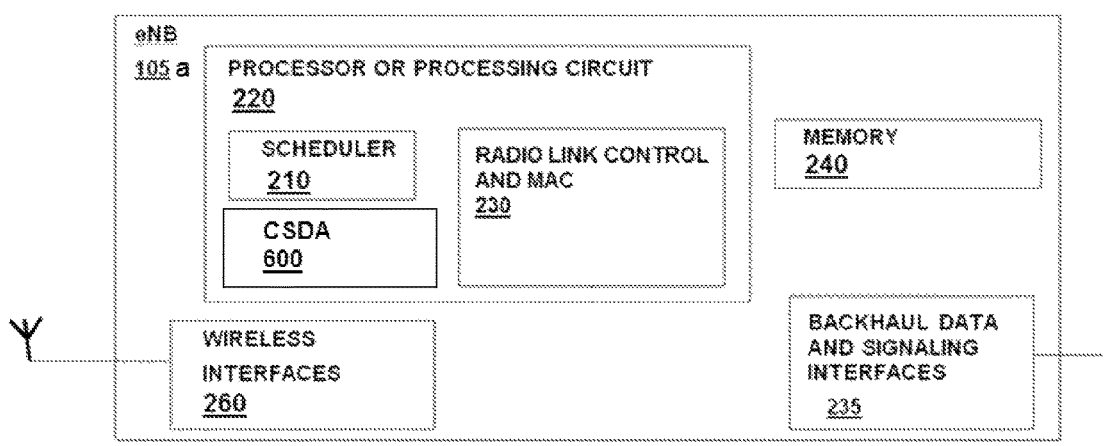
FIG. 9 illustrates a reconfigured E-UTRAN Node B (eNB), in accordance with an example embodiment.

FIG. 8 is a flowchart for a method of generating a new restricted set of cyclic shifts for LTE PRACH preambles, which may be utilized for high speed cells, in accordance with an example embodiment. The method may be performed by the processor 220 of the re-configured eNB 105a that is depicted in FIG. 9.

Referring to FIG. 8, in step S500, the processor 220 may cause the cyclic shift determining agent (CSDA) 600 of eNB 105a to obtain the PRACH preamble configuration parameters (which may be configured by a network operator) for the generation of PRACH preambles. The parameters may include the PRACH preamble format (where the preamble format may be defined in Table 5.7.1-1 of 3GPP TS 36.211), the Zero Correlation Zone Configuration index (where the index may be defined in Table 5.7.2-1 of 3GPP TS 36.211), the physical root sequence index for the root Zadoff-Chu sequences (where the index may be defined in Table 5.7.2-4 and 5.7.2-5 of 3GPP TS 36.211). The conventional approach may be used for the configuration of these parameters. In addition, if a cell is required to support high speed UEs with the uplink frequency offset up to the twice of the PRACH subcarrier spacing, namely, in a range of [−2.5 KHz, +2.5 KHz], a network operator may operate the network to include an "indicator" in the configuration parameters, where the "indicator" may indicate that the new restricted set of cyclic shifts should be generated to support uplink frequency offset up to +/−2.5 KHz.

In step S502 of FIG. 8, the processor 220 of eNB 105a may cause the the CSDA 600 to obtain the random access preamble sequence length $N_{ZC}$ based on configured preamble formats that are well-known, and included in Table 5.7.2-1 of TS 36.211. For each preamble format, there may be one corresponding length random access preamble sequence length $N_{ZC}$, as defined in TS 36.211 Table 5.7.2-1.

Also in step S502 of FIG. 8, the processor 220 of eNB 105a may cause the CSDA 600 to obtain the cyclic shift $N_{CS}$ of the restricted set from Table 5.7.2-2 of TS 36.211, based on the configured zero Correlation Zone Configuration index. For each zero Correlation Zone Configuration index, there may be a corresponding cyclic shift $N_{CS}$ for the preamble formats 0-3, as defined in Table 5.7.2-2 of TS 36.211. For the generation of the new restricted set, example embodiments may still use the cyclic shift $N_{CS}$ of the current (conventional) restricted set, as defined in Table 5.7.2-2 in TS 36.211.

In step S504 of FIG. 8, the processor 220 of eNB 105a may cause the CSDA 600 to choose one of the physical root Zadoff-Chu sequence index u from the list of configured root Zadoff-Chu sequence indexes in order to generate the cyclic shifts for the restricted set for the chosen root Zadoff-Chu sequence index.

In step S506 of FIG. 8, the processor 220 of eNB 105a may cause the CSDA 600 to calculate the cyclic shift $(d_u)$ for the chosen root Zadoff-Chu sequence via Equation 7 (see above), where $d_u$ may correspond to the cyclic shift caused by the uplink frequency offset that may be equal to the PRACH subcarrier spacing of 1.25 KHz.

In step S508 of FIG. 8, the processor 220 of eNB 105a may cause the CSDA 600 to generate the cyclic shifts of the new restricted set for the selected root Zadoff-Chu sequence with the following sequence.

A) Determine input parameters for the generation of the cyclic shifts, which may include: a) a random access preamble Zadoff-Chu sequence length $N_{ZC}$ (which may be determined based on the configured preamble format from Table 5.7.2-1 of 3GPP TS 36.211); b) the cyclic shift $N_{CS}$ for the restricted set (which may be determined based on the configured Zero Correlation Zone Configuration index from Table 5.7.2-2 of 3GPP TS 36.211); and c) the selected root Zadoff-Chu sequence u.

B) Calculate the cyclic shift $d_u$ using Equation 7 (above) using the above input parameters, $N_{ZC}$, $N_{CS}$ and u;

C) Calculate the parameters $n_{shift}^{RA}, d_{start}, n_{group}^{RA}, \bar{n}_{shift}^{RA}$ using Equation 17-24 with the cyclic shift d; and D) Calculate the cyclic shifts $C_v$ of the new restricted set using Equation 8 with the parameters $n_{shift}^{RA}, d_{start}, n_{group}^{RA}, \bar{n}_{shift}^{RA}$.

A difference between a conventional approach to determining a restricted set (that may be determined based on Equations 7, 8, 9-16), and a determination of a new restricted set (that may be determined based on Equations 7, 8, 17-24) is that the former approach may be generated based on a principle that for each cyclic shift $C_v$ included in the (conventional) restricted set, the cyclic shift $C_v \pm d_u$ may be excluded from the (conventional) restricted set. Because the cyclic shift $d_u$ may correspond to the frequency offset of subcarrier spacing 1.25 KHz, the conventional restricted set is effective in handling uplink frequency offsets up to one conventional PRACH subcarrier spacing (i.e., +/−1.25 KHz). However, the conventional restricted set may not be effective in handling the uplink frequency offsets that may be up to twice the conventional PRACH subcarrier spacing (where twice the conventional spacing may be +/−2.50 KHz), because for a cyclic shift $C_v$ included in the conventional restricted set, the cyclic shift $C_v \pm 2d_u$ may also be included in the conventional restricted set. Thus, when a conventional eNB 105 may detect PRACH preamble with cyclic shift $C_v \pm 2d_u$, the conventional eNB 105 may not be able to determine whether the transmitted preamble has been created with cyclic shift $C_v \pm 2d_u$ or with cyclic shift $C_v$ because the uplink frequency offsets may cause the transmitted preamble with cyclic shift $C_v$ to be detected as a preamble with cyclic shift $C_v \pm 2d_u$.

Using Equations 7, 8, 17-24, the new restricted set may be created based on a principle that for each cyclic shift $C_v$ that is included in the new restricted set, the cyclic shifts $C_v \pm d_u$ and $C_v \pm 2d_u$ may be excluded from the new restricted set. Since the cyclic shift $p^*d_u(p=1,2)$ may correspond to the frequency offset of subcarrier spacing $p^*1.25$ KHz, the new restricted set may be effective in handling the uplink frequency offsets up to twice of PRACH subcarrier spacing (i.e., the uplink frequency offsets may be +/−2.5 KHz). Thus, regardless of whether a reconfigured eNB 105a (see FIG. 9) detects a PRACH preamble with cyclic shift $C_v \pm d_u$, or $C_v \pm 2d_u$ due to the impact of the uplink frequency offsets, the eNB 105a may correctly determine the transmitted preamble is created with cyclic shift $C_v$.

In step S510 of FIG. 8, the processor 220 of eNB 105a may cause the CSDA 600 to determine whether it has generated cyclic shifts for the new restricted set for all of root Zadoff-Zhu sequence indexes configured in step S500. If not, the processor 220 of eNB 105a may cause the CSDA 600 to pick another root Zadoff-Zhu sequence index from the remaining root Zadoff-Zhu sequence indexes, and then repeat the steps S506 and S508 to generated cyclic shifts for the new restricted set.

Once the number of cyclic shifts for the new restricted set are generated, as determined in step S510 of FIG. 8, the generated cyclic shifts of the new restricted set with the corresponding root Zadoff-Chu sequence indexes may be provided to the RLC and MAC controller 230 for use in controlling network traffic (i.e., network communications) between UE 110 and eNB 105a over the PRACH channel, where the generated cyclic shifts of the new restricted set may be used for the cells supporting HST UEs 110 with uplink frequency offset up to +/−2.5 KHz.

FIG. 9 illustrates a reconfigured E-UTRAN Node B (eNB) 105a, in accordance with an example embodiment. Specifically, the eNB 105a may be identical to the eNB included in FIG. 2 (described above), with the following difference: eNB 105a may include a cyclic shift determining agent (CSDA) 600 that may be controlled by processor 220 to perform the functions described in the flowchart of FIG. 8 (described above).

Figure 10:
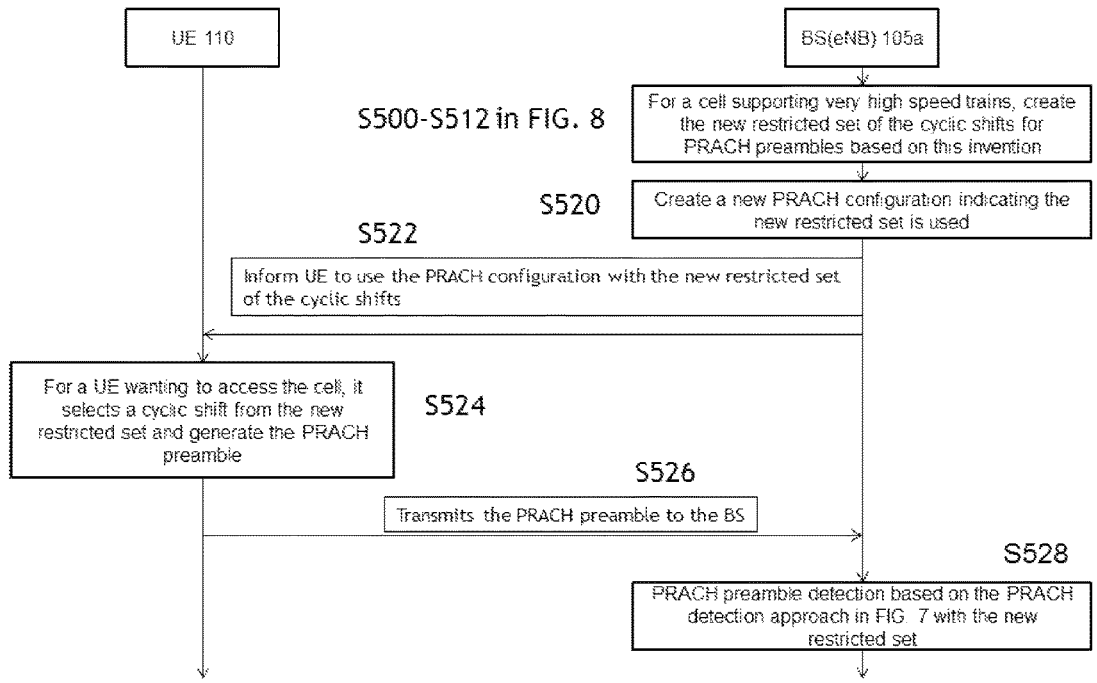
FIG. 10 is a communication diagram illustrating communications between a re-configured E-UTRAN Node B (eNB) and a User Equipment (UE), in accordance with an example embodiment.

FIG. 10 is a communication diagram illustrating communications between a re-configured E-UTRAN Node B (eNB) and a User Equipment (UE), where these communications utilize the new restricted set of cyclic shifts for a LTE PRACH, in accordance with an example embodiment. These communications may be performed between the re-configured eNB 105a (FIG. 9) and UE 110 (FIG. 1).

Referring to FIG. 10, the processor 220 of eNB 105a may first cause the cyclic shift determining agent (CSDA) 600 of eNB 105a to generate the new restricted set of cyclic shifts for LTE PRACH preambles for high speed cells, via the steps S500-S512 of FIG. 8 (described above).

In step S520 of FIG. 10, the processor 220 of the re-configured eNB 105a may create a new PRACH configuration that may include the PRACH parameters configured by the Operators in S500 in FIG. 8, namely the Preamble format, the zero Correlation Zone Configuration index, the root sequence indexes for the Zadoff-Chu sequences, and the "indicator" indicating a need for new restricted set. In addition, the new PRACH configuration may also include the generated cyclic shifts of the new restricted set, which may be generated by steps S500 to S512 of FIG. 8.

In step S522 of FIG. 10, the eNB 105a may inform the UEs 110 under the cells coverage to use the new PRACH configuration by sending the new PRACH configuration with or without the new restricted set of cyclic shifts to UE 110. The eNB 105a may send the new PRACH configuration information to the UE 110 either via a system information broadcast message, or via a dedicated message specifically directed at the UE 110. Any other well-known methods for broadcasting the PRACH configuration information to the UEs 110 may also be utilized.

In step S524 of FIG. 10, if the UE 110 attempts to access the eNB 105a, and if the new PRACH configuration received at the UE 110 includes one or more cyclic shifts of the new restricted set, the UE 110 may select a cyclic shift from the received cyclic shifts of the new restricted set to generate the PRACH preamble.

Also in step S524 of FIG. 10, if the UE 110 attempts to access the eNB 105a, and if the new PRACH configuration received by the UE 110 does not include generated cyclic shifts of the new restricted set, but includes the PRACH configured parameters, namely the Preamble format, zero Correlation Zone Configuration index, and the root sequence indexes for the Zadoff-Chu sequences, the UE may itself generate a cyclic shift of the new restricted set following the steps S502-S508 in FIG. 8 described before. Then, the UE may create a PRACH preamble based on its generated cyclic shift of the new restricted set.

In step S526 of FIG. 10, the UE 110 may transmit the created PRACH preamble to the eNB 105a.

In step S528 of FIG. 10, the eNB may detect the PRACH preamble that may be generated using a cyclic shift from the new restricted set based on PRACH detection approach proposed above in FIG. 7.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method for calculating random access preambles based on cyclic shifts, wherein the calculation of cyclic shifts for restricted sets is based on $C_v = d_{start} \lfloor v/n_{shift}^{RA} \rfloor + (v \mod n_{shift}^{RA}) N_{CS}$ $v = 0, 1, \ldots, n_{shift}^{RA} n_{group}^{RA} + \bar{n}_{shift}^{RA} - 1$, wherein a first and a second restricted set of cyclic shifts can be generated, wherein, an indicator in configuration parameters indicates whether the second restricted set of cyclic shifts should be generated, wherein the calculation of at least two of the parameters $n_{shift}^{RA}$, $d_{shift}, n_{group}^{RA}$, $\bar{n}_{shift}^{RA}$ is different for the first and the second set of cyclic shifts, the method comprising:

determining, by one or more processors of at least one network node, if the indicator indicates whether the second restricted set of cyclic shifts should be generated, and if so, calculating, by the one or more processors, cyclic shifts of the second restricted set based on: for $N_{CS} \leq d_u < N_{ZC}/S$ parameters are determined according to:

$$n_{shift}^{RA} = \lfloor d_u/N_{CS} \rfloor$$

$$d_{start} = 4d_u + n_{shift}^{RA} N_{CS}$$

$$n_{shift}^{RA} = \lfloor N_{ZC}/d_{start} \rfloor$$

$$\bar{n}_{shift}^{RA} = \max(\lfloor (N_{ZC} - 4d_v - n_{group}^{RA} d_{start})/N_{CS} \rfloor, 0),$$

wherein $N_{ZC}$ represents a random access preamble sequence length, $N_{CS}$ represents a configured cyclic shift, value for a restricted set, and cyclic shift $d_u$ represents a cyclic shift dependent on $N_{ZC}$, controlling, by the one or more processors, network traffic using the random access preambles, and wherein a different calculation for a parameter is performed by using a different equation for calculating the parameter for the second restricted set of cyclic shifts as compared to the calculation of the same parameter for the first restricted set of cyclic shifts, the restricted sets being suitable for high speed travel to support uplink frequency offset for a physical random access channel (PRACH) subcarrier spacing, the uplink frequency offset between the cyclic shifts of the restricted set of the preamble sequences being configured to be larger than the Doppler shift associated the high speed travel.

2. The method of claim 1, further comprising:

calculating cyclic shifts of the second restricted set based on: for $N_{ZC}/5 \leq d_u \leq (N_{ZC} - N_{CS})/4$ parameters are determined according to:

$$n_{shift}^{RA} \times \lfloor (N_{ZC}-4d_u)/N_{CS} \rfloor$$

$$d_{start}=N_{ZC}-4d_u+n_{shift}^{RA}N_{CS}$$

$$n_{group}^{RA}=\lfloor d_u/d_{start} \rfloor$$

$$\bar{n}_{shift}^{RA}=\min(\max(\lfloor (d_u-n_{group}^{RA}d_{start})/N_{CS} \rfloor, 0), n_{shift}^{RA}).$$

3. The method of claim 1, further comprising:
determining the random access preamble sequence length $N_{ZC}$ based on a configured preamble format.

4. The method of claim 1, further comprising:
determining the cyclic shift $N_{CS}$ for the restricted set based on a configured Zero Correlation Zone Configuration index.

5. The method of claim 1, further comprising:
determining cyclic shift $d_u$ as follows:

$$d_u = \begin{cases} r & 0 \le r < N_{ZC}/2 \\ N_{ZC}-r & \text{otherwise} \end{cases}$$

where r may be the smallest non-negative integer that fulfils $(ru) \mod N_{ZC}=1$.

6. The method of claim 1, further comprising:
calculating random access preambles based on a root Zadoff-Chu sequence by the following cyclic shifts:

$$x_{u,v}(n)=x_u((n+C_v) \mod N_{ZC}).$$

7. User Equipment (UE), comprising:
one or more processors configured to,
receive, from a network node, an indicator for calculating a second set of preamble sequences by a method according to claim 1 and which the UE is allowed to use,
calculate and select a preamble out of the indicated allowed preamble sequences, and
send a physical layer random access preamble representing the selected preamble through a physical random access channel (PRACH) to the network node.

8. The UE of claim 7, wherein the one or more processors are further configured to,
receive, from the network node, a PRACH configuration including the indicator.

9. The method of claim 1, wherein the uplink frequency offset is in a range of −2.5 KHz to +2.5 KHz.

10. The method of claim 1, wherein the uplink frequency offset is at least twice a PRACH subcarrier spacing.

11. An apparatus, comprising:
one or more processors configured to,
calculate random access preambles based on cyclic shifts, wherein the calculation of cyclic shifts for restricted sets is based on $C_v=d_{start}\lfloor v/n_{shift}^{RA} \rfloor+(v \mod n_{shift}^{RA}) N_{CS}$ $v=0,1,\ldots,n_{shift}^{RA}n_{group}^{RA}+\bar{n}_{shift}^{RA}-1$, wherein a first and a second restricted set of cyclic shifts can be generated, wherein an indicator in configuration parameters indicates whether the second restricted set of cyclic shifts should be generated, wherein the calculation of at least two of the parameters $n_{shift}^{RA}$, $d_{start}$, $n_{group}^{RA}$, $\bar{n}_{shift}^{RA}$ is different for the first and the second set of cyclic shifts, wherein the one or more processors are further configured to,
determine if the indicator indicates whether the second restricted set of cyclic shifts should be generated, and
if so, calculate cyclic shifts of the second restricted set based on: for $N_{CS} \le d_u < N_{ZC}/5$ parameters are determined according to:

$$n_{shift}^{RA}=\lfloor d_u/N_{CS} \rfloor$$

$$d_{start}=4d_u+n_{shift}^{RA}N_{CS}$$

$$n_{group}^{RA}=\lfloor N_{ZC}/d_{start} \rfloor$$

$$\bar{n}_{shift}^{RA}=\max(\lfloor (N_{ZC}-4d_u-n_{group}^{RA}d_{start})/N_{CS} \rfloor, 0),$$

wherein
$N_{ZC}$ represents a random access preamble sequence length, $N_{CS}$ represents a configured cyclic shift value for a restricted set, and cyclic shift $d_u$ represents a cyclic shift dependent on $N_{ZC}$, and
control network traffic using the random access preambles, and wherein a different calculation for a parameter is performed by using a different equation for calculating the parameter for the second restricted set of cyclic shifts as compared to the calculation of the same parameter for the first restricted set of cyclic shifts,
the restricted sets being suitable for high speed travel to support uplink frequency offset for a physical random access channel (PRACH) subcarrier spacing, the unlink frequency offset between the cyclic shifts of the restricted set of the preamble sequences being configure to be larger than the Doppler shift associated with the high speed travel.

12. The apparatus of claim 11, wherein the uplink frequency offset is in a range of −2.5 KHz to +2.5 KHz.

13. The apparatus of claim 11, wherein the uplink frequency offset is at least twice a PRACH subcarrier spacing.

* * * * *